United States Patent
He et al.

(10) Patent No.: US 8,723,728 B2
(45) Date of Patent: May 13, 2014

(54) FAILURE COMPENSATION METHOD AND APPARATUS FOR AN ACTIVE ANTENNA, AND ACTIVE ANTENNA DEVICE

(71) Applicant: Huawei Technologies Co., Ltd, Shenzhen (CN)

(72) Inventors: Pinghua He, Shenzhen (CN); Jianjun Chen, Shenzhen (CN); Xueru Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/900,245

(22) Filed: May 22, 2013

(65) Prior Publication Data

US 2013/0257654 A1 Oct. 3, 2013

Related U.S. Application Data

(63) Continuation of application No. PCT/CN2011/074970, filed on May 31, 2011.

(30) Foreign Application Priority Data

Nov. 22, 2010 (CN) .......................... 2010 1 0557317

(51) Int. Cl.
  *H01Q 3/00* (2006.01)
  *H01Q 3/26* (2006.01)
  *H01Q 3/36* (2006.01)
(52) U.S. Cl.
  CPC .............. *H01Q 3/2605* (2013.01); *H01Q 3/26* (2013.01); *H01Q 3/36* (2013.01)
  USPC ...................................................... 342/372
(58) Field of Classification Search
  USPC ........................................................ 342/372
  See application file for complete search history.

(56) References Cited

U.S. PATENT DOCUMENTS

| | | | | |
|---|---|---|---|---|
| 6,140,976 A | * | 10/2000 | Locke et al. | 343/853 |
| 2006/0114148 A1 | * | 6/2006 | Pillai | 342/195 |
| 2009/0243931 A1 | * | 10/2009 | Weckerle et al. | 342/372 |

FOREIGN PATENT DOCUMENTS

| | | |
|---|---|---|
| CN | 1722871 A | 1/2006 |
| CN | 1913402 A | 2/2007 |
| CN | 101154976 A | 4/2008 |
| EP | 1 003 298 A1 | 5/2000 |
| JP | 2010-164469 A | 7/2010 |

(Continued)

OTHER PUBLICATIONS

Yeo et al., "Array Failure Correction with a Genetic Algorithm", IEEE Transactions on Antennas and Propagation, vol. 47, No. 5, pp. 823-828, May 1999.*

(Continued)

*Primary Examiner* — Frank J McGue
(74) *Attorney, Agent, or Firm* — Slater & Matsil, LLP

(57) ABSTRACT

A failure compensation method includes detecting a Digital Beam-forming (DBF) coefficient of each of multiple transceiver channels in real time. When a failure of any one of the transceiver channels is detected, a current group of DBF coefficients of the multiple transceiver channels at a current failure status and corresponding failure mode information are obtained. Optimization processing is performed on the current group of DBF coefficients through a preset optimization algorithm so as to calculate a first group of DBF coefficients which is more adaptive to the failure mode information than the current group of DBF coefficients. The DBF coefficients of the transceiver channels are updated according to the first group of DBF coefficients.

9 Claims, 4 Drawing Sheets

(56) References Cited

FOREIGN PATENT DOCUMENTS

| WO | WO 00/55938 A1 | 9/2000 |
|---|---|---|
| WO | WO 2010/087749 A1 | 8/2010 |

OTHER PUBLICATIONS

Liang et al., "Development of 61-Channel Digital Beam-Forming (DBF) Transmitter Array for Mobile Satellite Communication", Progress in Electromagnetic Research, PIER 94, 177-195, 2009.*

First Office Action of Chinese Application No. 201010557317.7 mailed Feb. 20, 2013, 19 pages (Partial Translation).
Written Opinion of the International Searching Authority received in International Application No. PCT/CN2011/074970 mailed Sep. 15, 2011, 8 pages.
Extended European Search Report received in Application No. 11189926.6-2411 mailed May 18, 2012, 7 pages.
International Search Report received in International Application No. PCT/CN2011/074970 mailed Sep. 15, 2011, 4 pages.

* cited by examiner

US 8,723,728 B2

FAILURE COMPENSATION METHOD AND APPARATUS FOR AN ACTIVE ANTENNA, AND ACTIVE ANTENNA DEVICE

CROSS-REFERENCE TO RELATED APPLICATIONS

This application is a continuation of International Application No. PCT/CN2011/074970, filed on May 31, 2011, which claims priority to Chinese Patent Application No. 201010557317.7, filed on Nov. 22, 2010, both of which are hereby incorporated by reference in their entireties.

TECHNICAL FIELD

The present invention relate to the field of communications technologies, and in particular, to a failure compensation method and apparatus for an active antenna, and an active antenna device.

BACKGROUND

In a mobile communication system, in order to reduce as much as possible a feeder loss caused by a long cable between a base station under a tower and an antenna on the tower, it gradually becomes a trend to move the base station onto the tower. Corresponding product forms gradually appear as well, among which active antennas are commonly used. In an active antenna product, multi-channel antenna arrays are usually disposed corresponding to multi-channel signals. The antennal array of each channel works in parallel, and two processing units, namely, a transceiver channel unit and a Baseband Processing Unit (BPU), are disposed corresponding to the antenna array of each channel. The transceiver channel unit is an analog circuit including a lot of components, and most of the components are high-voltage, large-power, and high-current components, thereby causing the temperature of the transceiver channel unit to rise in work, which may further lead to a failure phenomenon; therefore, the reliability is low.

In view of the failure of a transceiver channel, the active antenna is usually equipped with an automatic compensation function, that is, to compensate the failed transceiver channel by adjusting a Digital Beam-forming (DBF) coefficient of the antenna array of each channel, thereby reducing the influence of the failed transceiver channel on the performance of the entire active antenna device. In the prior art, the automatic compensation function of the active antenna is usually implemented in a table lookup manner. In the table lookup compensation method, for each failure mode of the transceiver channel, a group of optimized DBF coefficients adaptive to the failure mode is calculated in advance. In addition, the calculated groups of the optimized DBF coefficients and the failure modes are correspondingly recorded in a DBF data table of the active antenna in advance. When a failure of some transceiver channel is detected, the active antenna device performs a query in the DBF data table according to a current failure mode, and writes the queried corresponding DBF coefficient into the transceiver channels that are not failed, thereby achieving an objective of failure compensation.

However, the table lookup compensation method has the following disadvantages: in an actual application, generally multiple antenna arrays are disposed in parallel corresponding to a single active antenna device, that is, multiple transceiver channels are disposed correspondingly; meanwhile, for each transceiver channel, actual failure modes further include different failure types (such as different downtilt angles). Therefore, in calculating the optimized DBF coefficient groups corresponding to the failure modes in advance, each failure combination should be fully considered, so as to avoid a phenomenon of failing to compensate a failure status. In this case, the corresponding workload is rather heavy. Especially, when the number of the antenna arrays forming the active antenna is great, the size of a failure mode DBF data table presents an exponential increase.

SUMMARY OF THE INVENTION

Embodiments of the present invention provide a failure compensation method and apparatus for an active antenna, and an active antenna device, so as to solve problems of a heavy workload and inflexible adjustment of a failure compensation method for the active antenna in the prior art.

In order to achieve the foregoing objectives, a failure compensation method for an active antenna provided in an embodiment of the present invention includes detecting a DBF coefficient of each of multiple transceiver channels in real time, so as to detect whether the transceiver channels have a failure, when a failure of any one of the multiple transceiver channels is detected, obtaining a current group of DBF coefficients corresponding to the multiple transceiver channels and failure mode information corresponding to the currently failed transceiver channel, in which the current group of DBF coefficients includes the current DBF coefficient of each of the transceiver channels, performing optimization processing on the current group of DBF coefficients, so as to calculate a first group of DBF coefficients which is more adaptive to the failure mode information than the current group of DBF coefficients, and correspondingly updating the DBF coefficients of the transceiver channels according to the first group of DBF coefficients.

In order to achieve the foregoing objectives, a failure compensation apparatus for an active antenna provided in an embodiment of the present invention includes a DBF coefficient detection module, configured to detect a DBF coefficient of each of multiple transceiver channels in real time, so as to detect whether the transceiver channels have a failure, an information obtaining module, configured to, when the DBF coefficient detection module detects a failure of any one of the multiple transceiver channels, obtain a current group of DBF coefficients corresponding to the multiple transceiver channels and failure mode information corresponding to the currently failed transceiver channel, in which the current group of DBF coefficients includes the DBF coefficient of each of the multiple transceiver channels, a first optimization processing module, configured to perform optimization processing on the current group of DBF coefficients, so as to calculate a first group of DBF coefficients which is more adaptive to the failure mode information than the current group of DBF coefficients, and a first DBF coefficient updating module, configured to correspondingly update the DBF coefficients of the transceiver channels according to the first group of DBF coefficients calculated by the first optimization processing module.

In order to achieve the foregoing objectives, an active antenna device provided in an embodiment of the present invention includes an active antenna module and the foregoing failure compensation apparatus for the active antenna, in which the failure compensation apparatus is connected to the active antenna module, and is configured to, when a failure of any one of multiple transceiver channels is detected, compensate a DBF coefficient of the failed transceiver channel.

In the failure compensation method and apparatus for the active antenna, and the active antenna device according to the embodiments of the present invention, when the failure of any one of the transceiver channels is detected in the active antenna, the current failure mode information and values of the DBF coefficient groups of the current transceiver channels corresponding to the failure mode information are obtained; a new group of DBF coefficients more adaptive to the current failure mode is calculated through a preset optimization algorithm according to the obtained information; and the obtained new DBF coefficient group is updated to each transceiver channel correspondingly. Thereby, under the premise that not much preparation calculation work needs to be done, the active antenna can obtain optimized DBF coefficient values through an automatic solution, and automatically distribute the optimized DBF coefficient values to each transceiver channel, so as to adjust DBF ratios corresponding to antenna arrays, thereby adjusting the performance of the entire active antenna device, and reducing the influence of the failed transceiver channel on the active antenna.

BRIEF DESCRIPTION OF THE DRAWINGS

To illustrate the technical solutions according to the embodiments of the present invention or in the prior art more clearly, the accompanying drawings for describing the embodiments or the prior art are given briefly in the following. Apparently, the accompanying drawings in the following description are only some embodiments of the present invention, and persons of ordinary skill in the art can derive other drawings from the accompanying drawings without creative efforts.

DETAILED DESCRIPTION OF ILLUSTRATIVE EMBODIMENTS

The following will describe the technical solution of the present invention in detail through specific embodiments with the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

In an active antenna product, as the reliability of a transceiver channel is relatively low, when work is done to some extent, a phenomenon that one or several transceiver channels have faults and are therefore damaged usually occurs. The damage of the transceiver channel leads to a poor lobe pattern index of the entire active antenna, further affects a cell coverage effect of the active antenna, and causes interferences on signal receiving of mobile terminals in the cell. Therefore, for various failure status of the transceiver channel, DBF coefficients of the current transceiver channels need to be adjusted in time, so as to compensate the performance of the active antenna.

Figure 1:
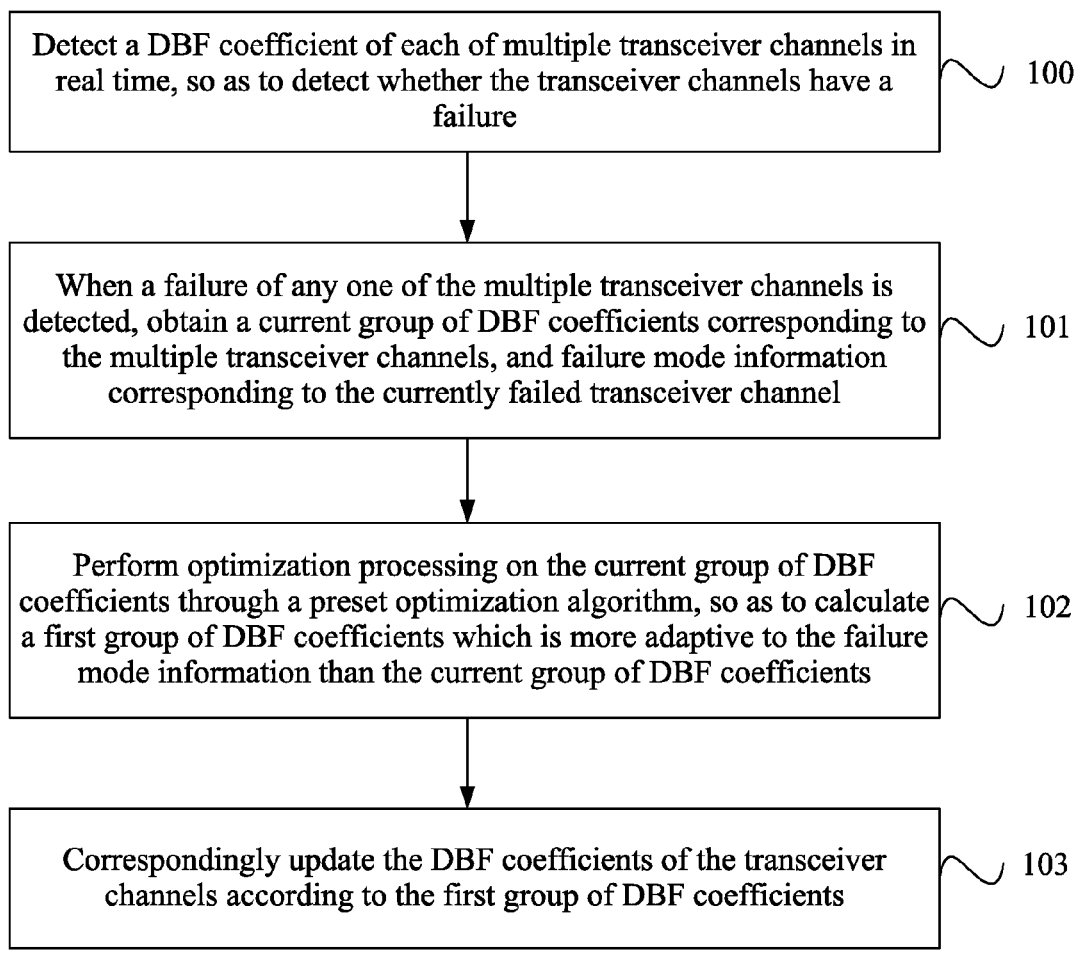
FIG. 1 is a flow chart of a failure compensation method for an active antenna according to an embodiment of the present invention.

FIG. 1 is a flow chart of a failure compensation method for an active antenna according to an embodiment of the present invention. As shown in FIG. 1, the method of this embodiment includes the following steps.

Step 100: Detect a DBF coefficient of each of multiple transceiver channels in real time, so as to detect whether the transceiver channels have a failure.

In the embodiment of the present invention, in order to automatically compensate various failure modes of the active antenna in time when a failure status occurs in transceiver channels of the active antenna, a failure compensation module is disposed inside the active antenna. Through real-time detection on the DBF coefficients of the transceiver channels of the active antenna, which specifically refers to real-time detection on index coefficients such as amplitudes, phases and time delays of the transceiver channels, the failure compensation module judges whether the transceiver channels are at the failure status according to the detected current DBF coefficients of the transceiver channels.

Step 101: When a failure of any one of the multiple transceiver channels is detected, obtain a current group of DBF coefficients corresponding to the multiple transceiver channels, and failure mode information corresponding to the currently failed transceiver channel.

When the failure compensation module knows that a failure phenomenon occurs in any one or several of the transceiver channels by detecting actual DBF coefficients of the transceiver channels, in order to determine a specific situation and information of all the transceiver channels at a current status, the failure compensation module obtains the current group of DBF coefficients corresponding to all the transceiver channels at the current status from all the transceiver channels, in which the current group of DBF coefficients includes the DBF coefficients of the transceiver channels at the current status, and obtains specific failure mode information at a current failure status.

Specifically, the failure mode information here is failure information related to a transceiver channel currently at the failure status, in which the failure mode information at least includes a channel identifier corresponding to the failed transceiver channel and a failure type corresponding to the failed transceiver channel. Through the channel identifier, the specific transceiver channel where the failure phenomenon occurs among the multiple transceiver channels can be identified; while through the failure type information, a specific failure degree, such as a complete failure or a partial failure, of the failed transceiver channel can be pointed out. The failure compensation module can know a specific distribution situation of the DBF coefficients in the transceiver channels at the current status and know a specific failure situation of the failed transceiver channel at the current status, according to the obtained failure mode information and the group of DBF coefficients currently corresponding to all the transceiver channels.

Step 102: Perform optimization processing on the current group of DBF coefficients through a preset optimization algorithm, so as to calculate a first group of DBF coefficients which is more adaptive to the failure mode information than the current group of DBF coefficients.

After obtaining the current group of DBF coefficients of the transceiver channels at the current failure status and the failure mode information corresponding to the currently failed transceiver channel, according to the two pieces of information, the failure compensation module in the active antenna may perform optimization calculation on the current group of DBF coefficients through the preset optimization algorithm, so as to calculate another group of DBF coefficients superior to the current group of DBF coefficients. In addition, in the embodiment of the present invention, the group of DBF coefficients obtained through calculation in this step is referred to as the first group of DBF coefficients.

It should be noted that, since the failure phenomenon already occurs in the transceiver channel of the active antenna at this time, the failed transceiver channel definitely affects the performance of the entire active antenna. Moreover, the obtained current group of DBF coefficients is definitely a group of DBF coefficients that affects a lobe pattern index of signal transmitting and receiving of the active antenna and has a poor performance. Therefore, the current group of DBF coefficients needs to be optimized and updated through the optimization algorithm. An optimization effect here merely refers to better adaptation to the current failure status of the transceiver channels of the active antenna compared with the current group of DBF coefficients.

Specifically, the failure mode information obtained by the failure compensation module already indicates the channel identifier of the transceiver channel where the failure phenomenon occurs currently and the failure type of the currently failed transceiver channel. In addition, according to the obtained current group of DBF coefficients, the failure compensation module can fully know the distribution of the DBF coefficients in the transceiver channels at the current status. Therefore, when using the optimization algorithm to perform the optimization calculation, the failure compensation module may use the current group of DBF coefficients as a comparison reference and use the failure mode information as an impact factor to calculate the first group of DBF coefficients that is more adaptive to the current failure mode information than the current group of DBF coefficients.

Step 103: Correspondingly update the DBF coefficients of the transceiver channels according to the first group of DBF coefficients.

After calculating the optimized first group of DBF coefficients according to the optimization algorithm, the failure compensation module distributes the DBF coefficients in the calculated group of DBF coefficients to the corresponding transceiver channels, so as to update the original DBF coefficients of the transceiver channels. Therefore, by updating the DBF coefficients, the failure compensation module readjusts weight ratios such as the amplitudes, phases and time delays of the transceiver channels. Since the current failure status of the transceiver channels of the active antenna is fully considered in the first group of DBF coefficients, compared with the DBF coefficient group before updating, the first group of DBF coefficients is more in line with a current working status of the transceiver channels. Therefore, with the adjustment of the new group of DBF coefficients, compared with the unadjusted failure status, the transceiver channels can obtain a better signal transmitting and receiving performance, and signal interference is declined to a normal working status. For the entire active antenna device, it is equivalent to compensating the performance of the failed transceiver channel, which reduces the influence of the failed transceiver channel on a performance index of the active antenna.

In the failure compensation method for the active antenna according to this embodiment, when the failure mode of any one of the transceiver channels is detected in the active antenna, the current failure mode information and the current group of DBF coefficients corresponding to the transceiver channels are obtained; a new group of DBF coefficients more adaptive to the current failure mode is calculated through the optimization algorithm according to the obtained information; and the obtained new DBF coefficient group is updated to the transceiver channels correspondingly. Thereby, under the premise that not much preparation calculation work needs to be done, the active antenna can obtain optimized DBF coefficient values through an automatic solution according to the obtained current group of DBF coefficients that causes the failure, and automatically distribute the optimized DBF coefficient values to the transceiver channels, thereby adjusting the performance of the entire active antenna device and reducing the influence of the failed transceiver channel on the performance index of the active antenna.

Figure 2:
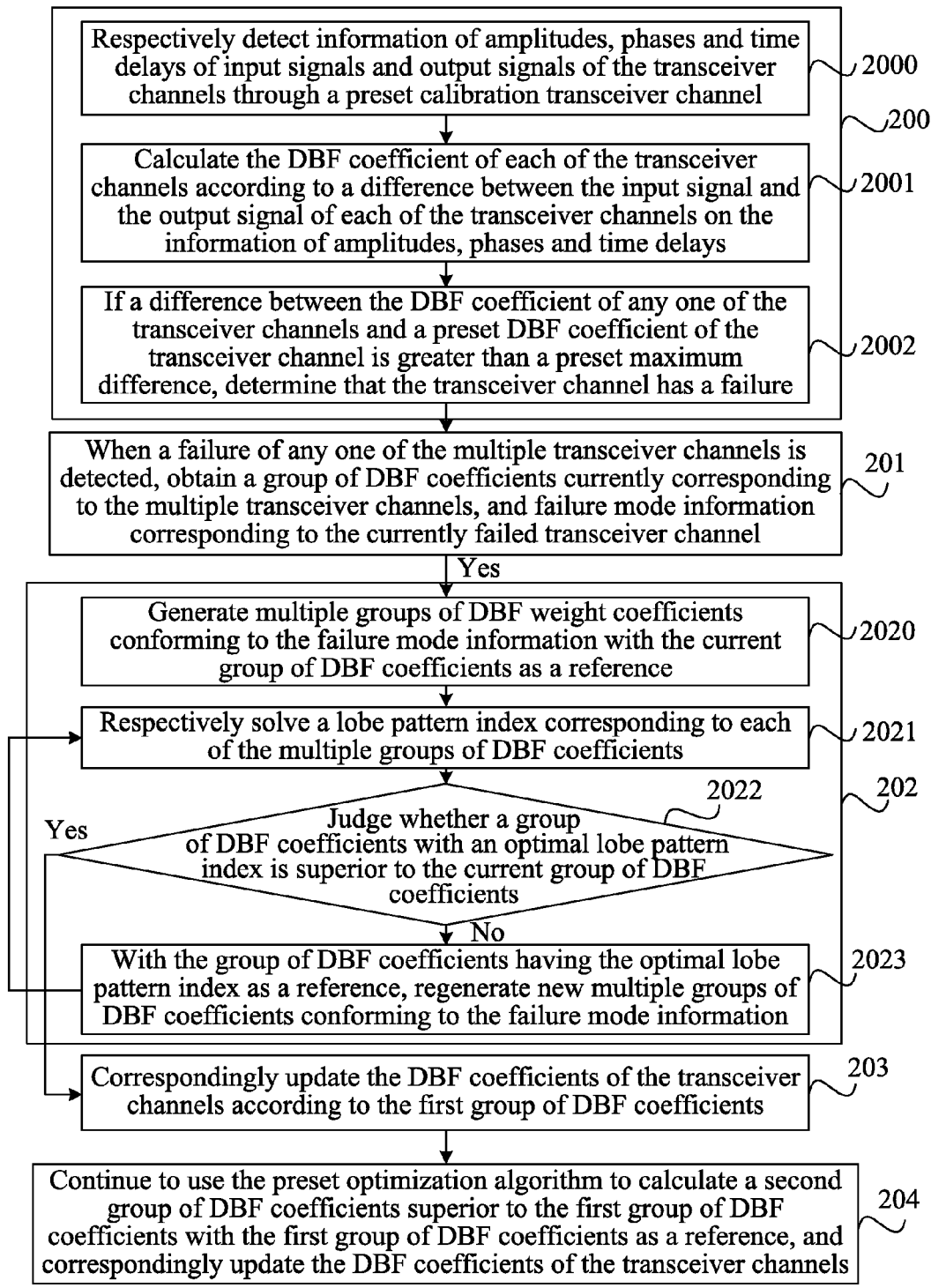
FIG. 2 is a flow chart of another failure compensation method for an active antenna according to an embodiment of the present invention.

FIG. 2 is a flow chart of another failure compensation method for an active antenna according to an embodiment of the present invention. As shown in FIG. 2, the method of this embodiment includes the following steps.

Step 200: Detect a DBF coefficient of each of multiple transceiver channels in real time.

In this embodiment, a specific detection of a failure compensation module on the DBF coefficients of the transceiver channels may include the following sub-steps.

Step 2000: Respectively detect information of amplitudes, phases and time delays of input signals and output signals of the transceiver channels through a preset calibration transceiver channel.

In order to detect a performance status of the multiple transceiver channels, in this embodiment, a public calibration transceiver channel is set in parallel with the multiple transceiver channels. The calibration transceiver channel has a coupled sampling relation with all other transceiver channels. Therefore, when a service signal (or a dedicated calibration signal) is transmitted in any one of the other transceiver channels, based on the coupled sampling relation with the transceiver channel, the calibration transceiver channel detects information such as the amplitudes, phases and time delays corresponding to the input signal and the output signal of the transceiver channel.

Step 2001: Calculate the DBF coefficient of each of the transceiver channels according to a difference between the input signal and the output signal of each of the transceiver channels on the information of amplitudes, phases and time delays.

After the information of amplitudes, phases and time delays of the input signal and the output signal of each of the transceiver channels is detected, the calibration transceiver channel may calculate the DBF coefficient corresponding to each of the transceiver channels according to the difference between the input signal and the output signal of each of the transceiver channels on the information of amplitudes, phases and time delay, in which the DBF coefficient reflects performance changes of a transmission signal when being transmitted in, when being input into and after being output from the corresponding transceiver channel.

Step 2002: If a difference between the DBF coefficient of any one of the transceiver channels and a preset DBF coefficient of the transceiver channel is greater than a preset maximum difference, determine that the transceiver channel has a failure.

Based on the calculated current DBF coefficients of the transceiver channels, the calibration transceiver channel may detect whether a failure phenomenon currently occurs in the transceiver channels by comparing current DBF coefficient values of the transceiver channels with DBF coefficient values preset for the transceiver channels. In fact, in the transceiver channels of the active antenna, a group of DBF coefficients is preset. The group of DBF coefficients is set for the transceiver channels at a normal working status. Moreover, through a reasonable weight distribution of the DBF coefficients among the transceiver channels, the group of DBF coefficients enables the transceiver channels at the normal working status to achieve a good signal transmitting and receiving performance.

In the foregoing step, the actual DBF coefficient values of the transceiver channels detected by the calibration transceiver channel in real time are not necessarily equal to the preset DBF coefficient values of the transceiver channels. The actually detected DBF coefficient value reflects performance changes of a signal when being transmitted in, before being input into and after being output from the corresponding transceiver channel to some extend, that is, reflects a signal transmission performance of the corresponding transceiver channel to some extend. Therefore, the detected DBF coefficient is compared with the preset normal DBF coefficient. If a great difference exists between the detected DBF coefficient and the originally configured normal DBF coefficient, it represents that the transceiver channel has a failure phenomenon.

Specifically, in this embodiment, a maximum tolerable difference of the DBF coefficients may be preset to measure whether the actually detected DBF coefficient reflects the failure phenomenon of the transceiver channel. If, for a transceiver channel, the difference between the actually detected DBF coefficient and the preset DBF coefficient exceeds the preset maximum difference, it can be determined that the transceiver channel has the failure phenomenon. In actual applications, a value of the set maximum difference may be determined according to an actual requirement for a transmission performance of the active antenna. The smaller a value of the maximum difference is, the higher requirement on the performance of the active antenna it represents; on the contrary, the larger a value of the maximum difference is, the lower requirement on the performance of the active antenna it represents.

Step 201: When a failure of any one of the multiple transceiver channels is detected, obtain a group of DBF coefficients currently corresponding to the multiple transceiver channels, and failure mode information corresponding to the currently failed transceiver channel.

When the failure compensation module detects, through the calibration transceiver channel, that one or several of the transceiver channels of the active antenna have the failure phenomenon, the failure compensation module needs to obtain the failure mode information corresponding to the currently failed transceiver channel and the current group of DBF coefficients corresponding to all the transceiver channels at the current status to optimize the DBF coefficients. Specifically, the failure mode information includes a channel identifier corresponding to the currently failed transceiver channels, and a failure type of the failed transceiver channel. Through the failure mode information, the failure compensation module can know one or several specific transceiver channels where the failure occurs, and know the specific failure type and failure degree of the failed transceiver channels, for example, whether the transceiver channel is at a completely damaged status and cannot work anymore, that is, at a complete failure status, or merely presents aging of partial components and declining of a signal amplitude, that is, at a partial failure status.

Different failure degrees of the transceiver channel may be obtained through comparing the actually detected DBF coefficient and the preset DBF coefficient. Specifically, if a transceiver channel is at the complete failure status, the transceiver channel cannot transmit signals at all, that is, the output signal is null. Therefore, during a detection process of the DBF coefficients, the actual detected DBF coefficient value of the transceiver channel should also be zero. If a transceiver channel is at the partial failure status, the transceiver channel still can transmit signals, only with poor transmission performance; therefore, during the detection process of the DBF coefficients, a difference between the actual detected DBF coefficient value of the transceiver channel and the preset DBF coefficient value of the transceiver channel should be relatively large, and the greater difference represents the more serious failure phenomenon.

Therefore, in this embodiment, the failure compensation module may still detect and obtain the failure type of each of the transceiver channels by comparing the difference between the detected DBF coefficient and the preset DBF coefficient. If, through comparison, the difference between the detected DBF coefficient and the preset DBF coefficient of a transceiver channel is less than the preset maximum difference, it may be basically determined that the failure phenomenon does not occur in the transceiver channel. If the detected DBF coefficient value of a transceiver channel is zero, it may be determined that the transceiver channel has a complete failure. If the difference between the detected DBF coefficient and the preset DBF coefficient exceeds the preset maximum difference and the detected DBF coefficient is not zero, that is, between the above two status, it may be determined that the transceiver channel has a partial failure.

The failure compensation module combines information reflecting that the failed transceiver channel is at the complete failure status or partial failure status with the channel identifier of the failed transceiver channel to form the failure mode information corresponding to the current failure status. According to the failure mode information, the failure compensation module may know how to perform optimization processing on the current group of DBF coefficients.

Step 202: Perform the optimization processing on the current group of DBF coefficients through a preset optimization algorithm, so as to calculate a first group of DBF coefficients that is more adaptive to the failure mode information than the current group of DBF coefficients.

After obtaining the current group of DBF coefficients and the failure mode information, the failure compensation module knows a specific failure situation currently. At this time, the failure compensation module may use the preset optimization algorithm to calculate a new group of DBF coefficients for the current transceiver channels according to the obtained information. Specifically, the step of calculating the optimized DBF coefficients may include the following sub-steps.

Step 2020: Generate multiple groups of DBF coefficients conforming to the failure mode information with the current group of DBF coefficients as a reference.

The failure compensation module randomly generates the multiple groups of DBF coefficients corresponding to the transceiver channels with reference to the failure mode information obtained from the failed transceiver channel, in which each group of DBF coefficients meets the failure status corresponding to the failure mode information. Specifically, if it is indicated in the failure mode information that a transceiver channel is at the complete failure status, when randomly generating the multiple groups of DBF coefficients, the failure compensation module may set the DBF coefficient corresponding to the transceiver channel in each group of DBF coefficients to zero. If it is indicated in the failure mode information that a transceiver channel is at the partial failure status, when randomly generating the multiple groups of DBF coefficients, the failure compensation module only needs to decrease the proportion of the DBF coefficient corresponding to the transceiver channel in each group of DBF coefficients, specifically, that is to decrease an amplitude value in the DBF coefficient of the transceiver channel, so as to match the partial failure status.

Step 2021: Respectively solve a lobe pattern index corresponding to each of the multiple groups of DBF coefficients.

Step 2022: Judge whether a group of DBF coefficients with an optimal lobe pattern index is superior to the current group of DBF coefficients according to the solved lobe pattern indexes. If the group of DBF coefficients with the optimal lobe pattern index is superior to the current group of DBF coefficients, perform step 203; while if the group of DBF coefficients with the optimal lobe pattern index is not superior to the current group of DBF coefficients, perform step 2023.

After generating the multiple groups of DBF coefficients conforming to the current failure mode information, for each group of DBF coefficients, the failure compensation module may respectively solve the lobe pattern index corresponding to each group of DBF coefficients. Therefore, according to the solved corresponding lobe pattern indexes, the failure compensation module may know the superior or inferior degree of the groups of DBF coefficients on adjusting the performance of the active antenna. Since multiple groups of DBF coefficients are randomly generated by the failure compensation module according to the failure mode information, a DBF coefficient group with a better adjustment capability is definitely included, which is capable of better adjusting the current performance of the entire active antenna; and a DBF coefficient group with a poorer adjustment capability is included, which fails to adjust the current performance of the active antenna well. Therefore, according to a lobe pattern index result obtained through a solution, the failure compensation module may sort all groups of DBF coefficients according to the superior or inferior degree.

Specifically, according to lobe patterns corresponding to the groups of DBF coefficients obtained through the solution, the failure compensation module may extract multiple lobe indexes from the lobe patterns. Apparently, all these lobe pattern indexes are important, and should be taken into consideration. Therefore, in order to perform superior or inferior sorting on the groups of DBF coefficients according to the calculated lobe pattern indexes, a lobe pattern index sum formula may be preset in the failure compensation module. In the sum formula, different lobe pattern indexes occupy different metric weights. Based on the sum formula, and according to the lobe pattern index values corresponding to the groups of DBF coefficients, the failure compensation module may calculate lobe pattern index sum values corresponding to the groups of DBF coefficients. Therefore, according to the sum values, the failure compensation module may perform sorting on the groups of DBF coefficients. The DBF coefficient corresponding to the sum value ranked first may be regarded as the optimal DBF coefficient.

Further, after all the generated DBF coefficient groups are sorted according to the superior or inferior of the lobe pattern indexes corresponding to the groups of DBF coefficients, the failure compensation module may compare the group of DBF coefficients ranked first, that is, the group of DBF coefficients with the optimal lobe pattern index, with the current group of DBF coefficients, so as to judge whether the group of DBF coefficients with the optimal lobe pattern index is superior to the current group of DBF coefficients. Specifically, the method for judging whether the group of DBF coefficients with the optimal lobe pattern index is superior to the current group of DBF coefficients may also be performed based on the foregoing lobe pattern index sum formula. If the optimal group of DBF coefficients calculated through the optimization algorithm is superior to the current group of DBF coefficients, it is indicated that the group of DBF coefficients calculated by the failure compensation module is capable of better adjusting the performance of the current active antenna. Therefore, the failure compensation module may update the current group of DBF coefficients accordingly. On the contrary, if an adjustment performance of the optimal group of DBF coefficients calculated by the failure compensation module is inferior to the current group of DBF coefficients, the failure compensation module should further perform an optimization calculation operation.

Step 2023: With the group of DBF coefficients having the optimal lobe pattern index as a reference, regenerate new multiple groups of DBF coefficients conforming to the failure mode information, and return to perform step 2021, until the first group of DBF coefficients superior to the current group of DBF coefficients is calculated.

Specifically, if among the multiple groups of DBF coefficients generated by the failure compensation module in the first round, the adjustment performance of the optimal group of coefficients is inferior to the current group of DBF coefficients, the failure compensation module may further select at least one group with the optimal lobe pattern index from the multiple groups of DBF coefficients randomly generated, so as to form a DBF coefficient set. The DBF coefficient groups in the DBF coefficient set are groups with optimal lobe pattern indexes among all the generated groups of DBF coefficients. Further, according to the groups of DBF coefficients included in the DBF coefficient set, the failure compensation module may use these DBF coefficient groups as a reference to regenerate more new multiple groups of DBF coefficients through the preset optimization algorithm, that is, using the groups of DBF coefficients in the DBF coefficient set as a parent to regenerate a next generation of multiple groups of DBF coefficient children.

Since the generated new multiple groups of DBF coefficients are based on the groups of DBF coefficients with superior lobe pattern indexes, and are generated through the optimization algorithm, the new multiple groups of DBF coefficients are further superior to the groups of DBF coefficients of the current DBF coefficient set. Therefore, after regenerating the next generation of multiple groups of DBF coefficients, the failure compensation module may solve the lobe pattern indexes of the new groups of DBF coefficients again, so as to re-select an optimal group of DBF coefficients to compare with the current group of DBF coefficients. If the lobe pattern index of the regenerated optimal group of DBF coefficients is still inferior to that of the current group of DBF coefficients, the failure compensation module may further use groups of DBF coefficients with superior lobe pattern indexes as a reference to generate a next generation of multiple groups of DBF coefficients, until the first group of DBF coefficients superior to the current group of DBF coefficients is obtained.

Step 203: Correspondingly update the DBF coefficients of the transceiver channels according to the first group of DBF coefficients.

After obtaining the first group of DBF coefficients superior to the current group of DBF coefficients, the failure compensation module correspondingly updates the DBF coefficients in DBF modules of the transceiver channels according to the DBF coefficient values in the first group of DBF coefficients, that is, correspondingly distributing the DBF values in the first group of DBF coefficients to the transceiver channels. Since the first group of DBF coefficients matches the current failure mode status of the active antenna and is superior to the current group of DBF coefficients, with the adjustment of the first group of DBF coefficients, the performance of the active antenna can be improved, and the phenomenon such as an interference of the failed transceiver channel on the active antenna is declined to the normal status.

Further, in this embodiment, when the failure phenomenon of the transceiver channel is detected in the active antenna, instead of immediately solving and calculating a new DBF coefficient value, the active antenna judges the failure status of the transceiver channel. Only when it is judged that the current failure mode exceeds a preset failure range, that is, the performance of the entire active antenna is seriously affected, the optimized new DBF coefficients are calculated, so that the DBF coefficients of the transceiver channels are updated. Therefore, during the process, an afterheat function of a failed transceiver module can be fully used. When the performance of the active antenna is adjusted through distributing new DBF coefficients, lobe pattern indexes of signal transmitting and receiving of the active antenna are better improved.

Step 204: Continue to use the preset optimization algorithm to calculate a second group of DBF coefficients superior to the first group of DBF coefficients with the first group of DBF coefficients as a reference, and correspondingly update the DBF coefficients of the transceiver channels.

After updating the DBF coefficients of the transceiver channels, further preferably, the failure compensation module may not stop an optimization program immediately; instead, the failure compensation module compares the obtained first group of DBF coefficients with a present optimization standard, so as to judge whether an optimization degree of the performance of the transceiver channels of the finally calculated first group of DBF coefficients meets a preset requirement. If the first group of DBF coefficients does not meet the preset optimization requirement, that is, the first group of DBF coefficients is not an optimal solution, the failure compensation module may continue to perform the optimization calculation operation. Specifically, the failure compensation module may use the same method as that for generating the first group of DBF coefficients, that is, the failure compensation module continues to use the preset optimization algorithm to generate multiple groups of DBF coefficients with the first group of DBF coefficients as a reference, and selects an optimal group from the multiple groups of DBF coefficients to serve as the second group of DBF coefficients, so as to correspondingly write the second group of DBF coefficients into the DBF modules of the transceiver channels.

Further, if the second group of DBF coefficients still does not meet the preset optimization standard, the failure compensation module may further use the second group of DBF coefficients as a reference to calculate a third group of DBF coefficients, a fourth group of DBF coefficients and so on through the same optimization algorithm, until a group of DBF coefficients meeting the set requirement is obtained, so as to update the DBF coefficients of the transceiver channels.

In the failure compensation method for the active antenna according to this embodiment, when the failure mode of any one of the transceiver channels is detected in the active antenna, the current failure mode information and the current group of DBF coefficients corresponding to transceiver channels are obtained; a new group of DBF coefficients more conforming to the current failure mode is calculated through the optimization algorithm according to the obtained information; and the obtained new DBF coefficient group is updated to the transceiver channels correspondingly. Thereby, under the premise that not much preparation calculation work needs to be done, the active antenna can obtain optimized DBF coefficient values through an automatic solution, and automatically distribute the optimized DBF coefficient values to the transceiver channels, so as to adjust DBF ratios corresponding to antenna arrays, thereby adjusting the performance of the entire active antenna device and reducing the influence of the failed transceiver channel on the performance of the active antenna.

Further, in this embodiment, when the failure phenomenon of the transceiver channels is detected in the active antenna, the optimized new DBF coefficient groups are calculated only when it is judged that the current failure mode exceeds a preset failure range, so that the DBF coefficients of the transceiver channels are updated; and only when the failure type of the failed transceiver channel is the complete failure, the failed transceiver channel is closed, so that the afterheat function of the failed transceiver module is fully used, and the lobe pattern indexes of signal transmitting and receiving of the active antenna are better improved.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a read-only memory (ROM), a random access memory (RAM), a magnetic disk, or an optical disk.

Figure 3:
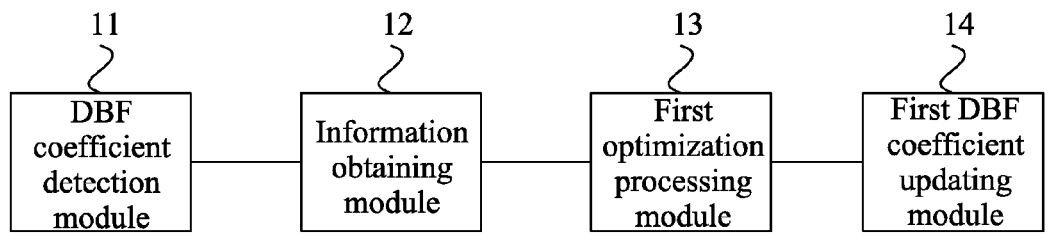
FIG. 3 is a schematic structural diagram of a failure compensation apparatus according to an embodiment of the present invention.

FIG. 3 is a schematic structural diagram of a failure compensation apparatus according to an embodiment of the present invention. As shown in FIG. 3, the failure compensation apparatus of this embodiment at least includes: a DBF coefficient detection module 11, an information obtaining module 12, a first optimization processing module 13, and a first DBF coefficient updating module 14.

The DBF coefficient detection module 11 is configured to detect a DBF coefficient of each of multiple transceiver channels in real time, so as to detect whether the transceiver channels have a failure. The information obtaining module 12 is configured to, when the DBF coefficient detection module 11 detects the failure of any one of the multiple transceiver channels, obtain a current group of DBF coefficients corresponding to the multiple transceiver channels and failure mode information corresponding to the currently failed transceiver channel. The first optimization processing module 13 is configured to perform optimization processing on the current group of DBF coefficients, so as to calculate a first group of DBF coefficients that is more adaptive to the failure mode information than the current group of DBF coefficients. The first DBF coefficient updating module 14 is configured to correspondingly update the DBF coefficients of the transceiver channels according to the first group of DBF coefficients calculated by the first optimization processing module 13.

Specifically, in this embodiment, for all the specific working processes related to the modules, references may be made to related contents disclosed in the foregoing embodiment of the failure compensation method for the active antenna, and the details are not described here again.

In the failure compensation apparatus according to the embodiment of the present invention, when a failure mode of any one of the transceiver channels is detected, the current failure mode information and the current group of DBF coefficients corresponding to the transceiver channels are obtained; a new group of DBF coefficients more in line with the current failure mode is calculated through an optimization algorithm according to the obtained information; and the obtained new DBF coefficient group is updated to the transceiver channels correspondingly. Thereby, under the premise that not much preparation calculation work needs to be done, the active antenna can obtain optimized DBF coefficient values through an automatic solution, and automatically distribute the optimized DBF coefficient values to the transceiver channels, so as to adjust DBF ratios corresponding to antenna arrays, thereby adjusting the performance of an entire active antenna device and reducing the influence of the failed transceiver channel on the performance of the active antenna.

Figure 4:
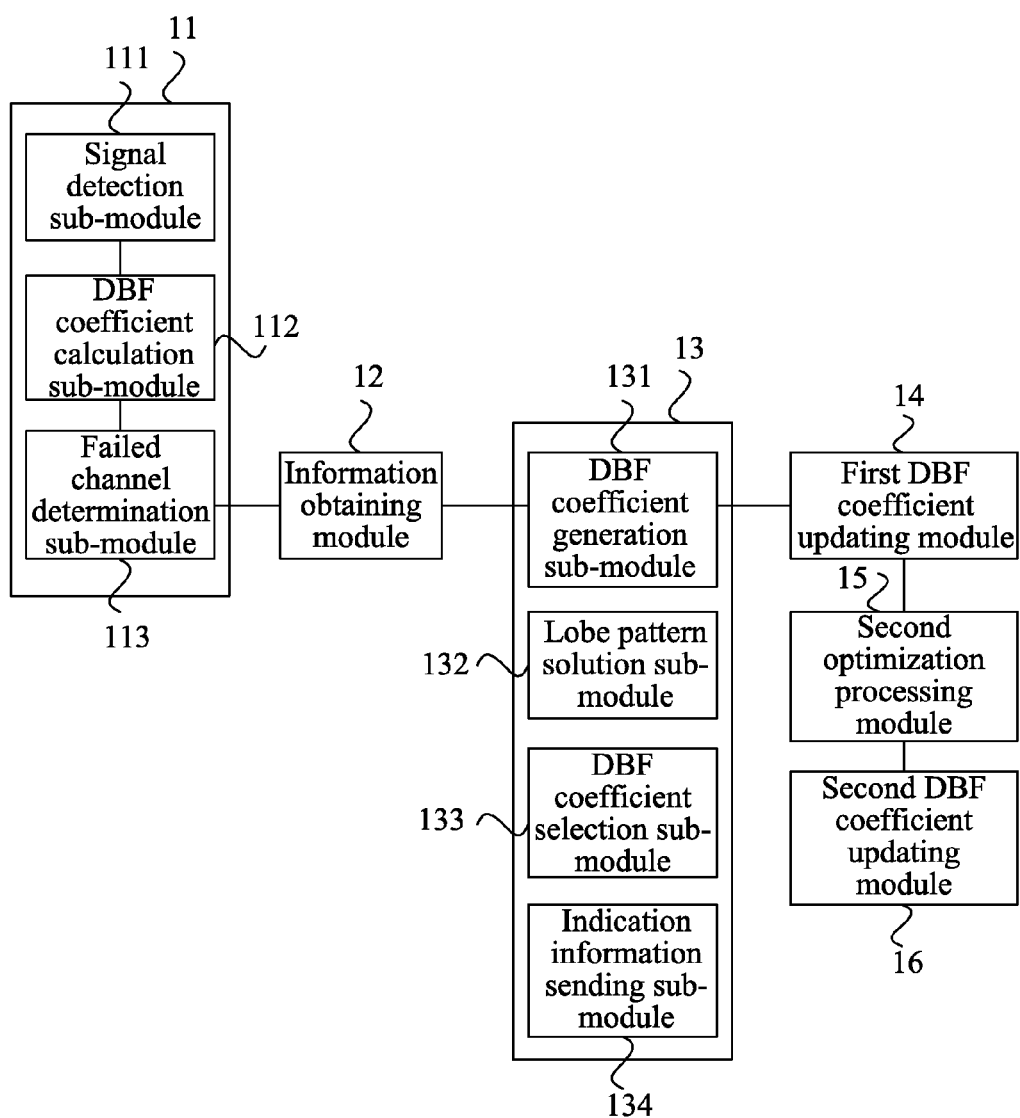
FIG. 4 is a schematic structural diagram of another failure compensation apparatus according to an embodiment of the present invention.

FIG. 4 is a schematic structural diagram of another failure compensation apparatus according to an embodiment of the present invention. Specifically, as shown in FIG. 4, based on the foregoing embodiment of the failure compensation apparatus, in a failure compensation apparatus of this embodiment, a DBF coefficient detection module 11 may specifically include a signal detection sub-module 111, a DBF coefficient calculation sub-module 112, and a failed channel determination sub-module 113.

The signal detection sub-module 111 is configured to respectively detect information of amplitudes, phases and time delays of input signals and output signals of transceiver channels through a preset calibration transceiver channel, in which the calibration transceiver channel has a coupled relation with each of the transceiver channels. The DBF coefficient calculation sub-module 112 is configured to calculate a DBF coefficient of each of the transceiver channels according to a difference between the input signal and the output signal of each of the transceiver channels on the information of amplitudes, phases and time delays detected by the signal detection sub-module 111. The failed channel determination module 113 is configured to, if a difference between the DBF coefficient of any one of the transceiver channels calculated by the DBF coefficient calculation sub-module 12 and a preset DBF coefficient of the transceiver channel is greater than a preset maximum difference, determine that the transceiver channel has a failure.

Further, in this embodiment, the first optimization processing module 13 may include a DBF coefficient generation sub-module 131, a lobe pattern solution sub-module 132, a DBF coefficient selection sub-module 133, and an indication information sending sub-module 134.

The DBF coefficient generation sub-module 131 is configured to generate multiple groups of DBF coefficients conforming to failure mode information through a preset optimization algorithm with a current group of DBF coefficients as a reference. The lobe pattern solution sub-module 132 is configured to solve a lobe pattern index corresponding to each of the multiple groups of DBF coefficients generated by the DBF coefficient generation sub-module 131. The DBF coefficient selection sub-module 133 is configured to; if a group of DBF coefficients with an optimal lobe pattern index among the multiple groups of DBF coefficients is superior to the current group of DBF coefficients, select the optimal group of DBF coefficients to serve as a first group of DBF coefficients. The indication information sending sub-module 134 is configured to, if the group of DBF coefficients with the optimal lobe pattern index among the multiple groups of DBF coefficients is not superior to the current group of DBF coefficients, send indication information to the DBF coefficient generation sub-module 131, in which the indication information is used to instruct the DBF coefficient generation sub-module 131 to continue to generate multiple groups of DBF coefficients conforming to the failure mode information through the preset optimization algorithm with the group of DBF coefficients having the optimal lobe pattern index as a reference, until the first group of DBF coefficients superior to the current group of DBF coefficients is calculated.

Further, the failure compensation apparatus of this embodiment may further include a second optimization processing module 15 and a second DBF coefficient updating module 16. The second optimization processing module 15 is configured to continue to calculate the second group of DBF coefficients superior to the first group of DBF coefficients through the preset optimization algorithm with the first group of DBF coefficients as a reference, if the first group of DBF coefficients does not meet a preset optimization standard, after the first DBF coefficient updating module 14 correspondingly updates the DBF coefficients of the transceiver channels, until the second group of DBF coefficients conforming to the preset optimization standard is obtained. The second DBF coefficient updating module 16 is configured to correspondingly update the DBF coefficients of the transceiver channels according to the second group of DBF coefficients after the second group of DBF coefficients is calculated.

Further, in this embodiment, the above failure mode information specifically includes a channel identifier of the failed channel and corresponding failure type information, and the failure type includes two failure modes, that is, a complete failure and a partial failure. Based on this, the DBF coefficient generation sub-module 131 is specifically configured to, if the failure type of the failed transceiver channel indicated in the failure mode information is the complete failure, generate multiple groups of DBF coefficients with the DBF coefficient corresponding to the failed transceiver channel being zero; while if the failure type of the failed transceiver channel indicated in the failure mode information is the partial failure, generate multiple groups of DBF coefficients with the DBF coefficient corresponding to the failed transceiver channel lower than a preset DBF coefficient of the failed transceiver channel.

Specifically, in this embodiment, for all the specific working processes related to all the foregoing modules, references may also be made to related contents disclosed in the foregoing embodiment of the failure compensation method for the active antenna, and the details are not described here again.

In the failure compensation apparatus according to the embodiment of the present invention, when the failure mode of any one of the transceiver channels is detected, the current failure mode information and the current group of DBF coefficients corresponding to the transceiver channels are obtained; a new group of DBF coefficients more conforming to the current failure mode is calculated through an optimization algorithm according to the obtained information; and the obtained new DBF coefficient group is updated to the transceiver channels correspondingly. Thereby, under the premise that not much preparation calculation work needs to be done, the active antenna can obtain optimized DBF coefficient values through an automatic solution, and automatically distribute the optimized DBF coefficient values to the transceiver channels, so as to adjust DBF ratios corresponding to antenna arrays, thereby adjusting the performance of an entire active antenna device and reducing the influence of the failed transceiver channel on the performance of the active antenna.

Further, in this embodiment, when the failure phenomenon of the transceiver channels is detected in the active antenna, the optimized new DBF coefficient groups are calculated only when it is judged that the current failure mode exceeds a preset failure range, so as to update the DBF coefficients of the transceiver channels; and only when it is judged that the failure type of the failed transceiver channel is the complete failure, the failed transceiver channel is closed, so that an afterheat function of the failed transceiver module is fully used, and the lobe pattern indexes of signal transmitting and receiving of the active antenna are better improved.

Figure 5:
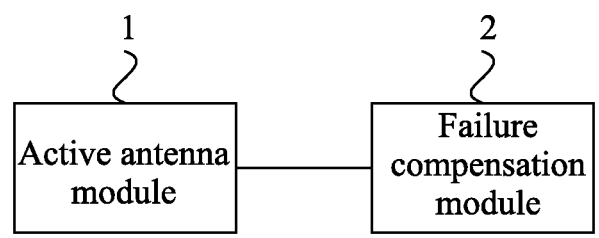
FIG. 5 is a schematic structural diagram of an active antenna device according to an embodiment of the present invention.

FIG. 5 is a schematic structural diagram of an active antenna device according to an embodiment of the present invention. As shown in FIG. 5, an active antenna device of this embodiment specifically includes an active antenna module 1 and the foregoing failure compensation apparatus 2. The failure compensation apparatus 2 is connected to the active antenna module 1, and is configured to, when a failure of any one of multiple transceiver channels is detected, compensate a DBF coefficient of the failed transceiver channel.

Specifically, in this embodiment, for all the modules included in the failure compensation apparatus, and all the working processes related to the modules, references may also be made to related contents disclosed in the foregoing embodiments of the failure compensation method and the failure compensation apparatus for the active antenna, and the details are not described here again.

In the active antenna device according to the embodiment of the present invention, when a failure mode of any one of the transceiver channels is detected, current failure mode information and a current group of DBF coefficients corresponding to transceiver channels are obtained; a new group of DBF coefficients more conforming to the current failure mode is calculated through an optimization algorithm according to the obtained information; and the obtained new DBF coefficient group is updated to the transceiver channels correspondingly. Thereby, under the premise that not much preparation calculation work needs to be done, the active antenna can obtain optimized DBF coefficient values through an automatic solution, and automatically distribute the optimized DBF coefficient values to the transceiver channels, so as to adjust DBF ratios corresponding to antenna arrays, thereby adjusting the performance of the entire active antenna device and reducing the influence of the failed transceiver channel on the performance of the active antenna.

Persons of ordinary skill in the art may understand that all or a part of the steps for implementing the embodiments may be implemented by a program instructing relevant hardware. The program may be stored in a computer readable storage medium. The program, when executed, execute the steps in the method embodiments, and the storage medium includes any medium that can store program codes, such as a ROM, a RAM, a magnetic disk, or an optical disk.

Finally, it should be noted that the foregoing embodiments are merely provided for describing the technical solutions of the present invention, but not intended to limit the present invention. Although the present invention has been described in detail with reference to the embodiments, it should be understood by persons of ordinary skill in the art that modifications can be made to the technical solutions described in the embodiments, or equivalent replacements can be made to some technical features in the technical solutions, and such modifications or replacements do not make the nature of the corresponding technical solutions depart from the spirit and scope of the present invention.

What is claimed is:

1. A failure compensation method for an active antenna, the method comprising:
   detecting a Digital Beam-forming (DBF) coefficient of a transceiver channel of multiple transceiver channels;
   determining the transceiver channel has a failure based on the detected DBF coefficient of the transceiver channel;
   after determination, detecting a current group of DBF coefficients corresponding to the multiple transceiver channels and obtaining failure mode information corresponding to the currently failed transceiver channel, wherein the current group of DBF coefficients comprises a current DBF coefficient of each of the multiple transceiver channels;
   performing optimization processing on the current group of DBF coefficients, so as to calculate a first group of DBF coefficients that is more adaptive to the failure mode information than the current group of DBF coefficients; and
   updating the DBF coefficients of the transceiver channels according to the first group of DBF coefficients;
   wherein performing the optimization processing comprises:
   generating multiple groups of DBF coefficients conforming to the failure mode information according to the current group of DBF coefficients;
   respectively solving a lobe pattern index corresponding to each of the multiple groups of DBF coefficients;
   if a group of DBF coefficients with an optimal lobe pattern index among the multiple groups of DBF coefficients is superior to the current group of DBF coefficients, selecting the optimal group of DBF coefficients to serve as the first group of DBF coefficients; and
   if a group of DBF coefficients with an optimal lobe pattern index among the multiple groups of DBF coefficients is not superior to the current group of DBF coefficients, regenerating multiple groups of DBF coefficients conforming to the failure mode information through a preset optimization algorithm with the group of DBF coefficients having the optimal lobe pattern index as a reference, and returning to the step of respectively solving the lobe pattern index corresponding to each of the multiple groups of DBF coefficients, until the first group of DBF coefficients superior to the current group of DBF coefficients is calculated;
   wherein
   the failure mode information comprises a channel identifier and a corresponding failure type of the failed transceiver channel and the failure type comprises a complete failure and a partial failure and generating the multiple groups of DBF coefficients conforming to the failure mode information comprises:
   if the failure type of the failed transceiver channel is a complete failure, generating multiple groups of DBF coefficients with the DBF coefficient corresponding to the failed transceiver channel being zero; and
   if the failure type of the failed transceiver channel is a partial failure, generating multiple groups of DBF coefficients with the DBF coefficient corresponding to the failed transceiver channel lower than a preset DBF coefficient of the failed transceiver channel.

2. The method according to claim 1, wherein detecting the DBF coefficient of a transceiver channel of multiple transceiver channels comprises:
   detecting information of amplitudes, phases and time delays of input signals and output signals of the multiple transceiver channels through a preset calibration transceiver channel, wherein the calibration transceiver channel has a coupled relation with each of the transceiver channels;
   calculating the DBF coefficient of each of the transceiver channels according to a difference between the input signal and the output signal of each of the transceiver channels on the information of amplitudes, phases and time delays; and
   wherein the determining the transceiver channel has a failure based on the detected DBF coefficient of the transceiver channel comprise:

if a difference between the DBF coefficient of any one of the transceiver channels and a preset DBF coefficient of the transceiver channel is greater than a preset maximum difference, determining that the transceiver channel has a failure.

3. The method according to claim 1, wherein after updating the DBF coefficients of the transceiver channels, the method further comprises:
if the first group of DBF coefficients does not meet a preset optimization standard, continuing to calculate a second group of DBF coefficients superior to the first group of DBF coefficients with the first group of DBF coefficients as a reference, until the second group of DBF coefficients meets the preset optimization standard; and
updating the DBF coefficients of the transceiver channels according to the second group of DBF coefficients.

4. A failure compensation apparatus, comprising:
a Digital Beam-forming (DBF) coefficient detection module, configured to detect a DBF coefficient of a transceiver channel of multiple transceiver channels and determine the transceiver channel has a failure based on the detected DBF coefficient of the transceiver channel;
an information obtaining module, configured to, when the DBF coefficient detection module determine the transceiver channel has a failure, detect a current group of DBF coefficients corresponding to the multiple transceiver channels and obtain failure mode information corresponding to the currently failed transceiver channel, wherein the current group of DBF coefficients comprises the current DBF coefficient of each of the multiple transceiver channels;
a first optimization processing module, configured to perform optimization processing on the current group of DBF coefficients, so as to calculate a first group of DBF coefficients that is more adaptive to the failure mode information than the current group of DBF coefficients; and
a first DBF coefficient updating module, configured to correspondingly update the DBF coefficients of the transceiver channels according to the first group of DBF coefficients calculated by the first optimization processing module;
wherein the first optimization processing module comprises:
a DBF coefficient generation sub-module, configured to generate multiple groups of DBF coefficients conforming to the failure mode information according to the current group of DBF coefficients;
a lobe pattern solution sub-module, configured to respectively solve a lobe pattern index corresponding to each of the multiple groups of DBF coefficients generated by the DBF coefficient generation sub-module;
a DBF coefficient selection sub-module, configured to, if a group of DBF coefficients with an optimal lobe pattern index among the multiple groups of DBF coefficients is superior to the current group of the DBF coefficients, select the optimal group of DBF coefficients to serve as the first group of DBF coefficients; and
an indication information sending sub-module, configured to, if the group of DBF coefficients with the optimal lobe pattern index among the multiple groups of DBF coefficients is not superior to the current group of DBF coefficients, send indication information to the DBF coefficient generation sub-module, wherein the indication information is used to instruct the DBF coefficient generation sub-module to continue to generate multiple groups of DBF coefficients conforming to the failure mode information with the group of DBF coefficients having the optimal lobe pattern index as a reference, until the first group of DBF coefficients superior to the current group of DBF coefficients is calculated;
wherein the DBF coefficient generation sub-module is configured to:
if it is indicated in the failure mode information that a failure type of the failed transceiver channel is a complete failure, generate multiple groups of DBF coefficients with the DBF coefficient corresponding to the failed transceiver channel being zero; and
if it is indicated in the failure mode information that a failure type of the failed transceiver channel is a partial failure, generate multiple groups of DBF coefficients with the DBF coefficient corresponding to the failed transceiver channel lower than a preset DBF coefficient of the failed transceiver channel.

5. The failure compensation apparatus according to claim 4, wherein the DBF coefficient detection module comprises:
a signal detection sub-module, configured to detect information of amplitudes, phases and time delays of input signals and output signals of the multiple transceiver channels through a preset calibration transceiver channel, wherein the calibration transceiver channel has a coupled relation with each of the transceiver channels;
a DBF coefficient calculation sub-module, configured to calculate the DBF coefficient of each of the transceiver channels according to a difference between the input signal and the output signal of each of the transceiver channels on the information of amplitudes, phases and time delays detected by the signal detection sub-module; and
a failed channel determination sub-module, configured to, determine that the transceiver channel has a failure, when a difference between the DBF coefficient of any one of the transceiver channels and a preset DBF coefficient of the transceiver channel is greater than a preset maximum difference.

6. The failure compensation apparatus according to claim 4, further comprising:
a second optimization processing module, configured to continue to calculate a second group of DBF coefficients superior to the first group of DBF coefficients with the first group of DBF coefficients as a reference, if the first group of DBF coefficients does not meet a preset optimization standard after the first DBF coefficient updating module correspondingly updates the DBF coefficients of the transceiver channels, until the second group of DBF coefficients meets the preset optimization standard; and
a second DBF coefficient updating module, configured to correspondingly update the DBF coefficients of the transceiver channels according to the second group of DBF coefficients.

7. An active antenna device, comprising:
an active antenna module; and
a failure compensation apparatus connected to the active antenna module and configured to, when a failure of any one of multiple transceiver channels is detected, compensate a Digital Beam-forming (DBF) coefficient of the failed transceiver channel, the failure compensation apparatus comprising:
a Digital Beam-forming (DBF) coefficient detection module, configured to detect a DBF coefficient of a transceiver channel of multiple transceiver channels and determine the transceiver channel has a failure based on the detected DBF coefficient of the transceiver channel;

an information obtaining module, configured to, when the DBF coefficient detection module determine the transceiver channel has a failure, detect a current group of DBF coefficients corresponding to the multiple transceiver channels and obtain failure mode information corresponding to the currently failed transceiver channel, wherein the current group of DBF coefficients comprises the current DBF coefficient of each of the multiple transceiver channels;

a first optimization processing module, configured to perform optimization processing on the current group of DBF coefficients, so as to calculate a first group of DBF coefficients that is more adaptive to the failure mode information than the current group of DBF coefficients; and a first DBF coefficient updating module, configured to correspondingly update the DBF coefficients of the transceiver channels according to the first group of DBF coefficients calculated by the first optimization processing module;

wherein the first optimization processing module specifically comprises:

a DBF coefficient generation sub-module, configured to generate multiple groups of DBF coefficients conforming to the failure mode information according to the current group of DBF coefficients;

a lobe pattern solution sub-module, configured to respectively solve a lobe pattern index corresponding to each of the multiple groups of DBF coefficients generated by the DBF coefficient generation sub-module;

a DBF coefficient selection sub-module, configured to, if a group of DBF coefficients with an optimal lobe pattern index among the multiple groups of DBF coefficients is superior to the current group of the DBF coefficients, select the optimal group of DBF coefficients to serve as the first group of DBF coefficients; and an indication information sending sub-module, configured to, if the group of DBF coefficients with the optimal lobe pattern index among the multiple groups of DBF coefficients is not superior to the current group of DBF coefficients, send indication information to the DBF coefficient generation sub-module, wherein the indication information is used to instruct the DBF coefficient generation sub-module to continue to generate multiple groups of DBF coefficients conforming to the failure mode information with the group of DBF coefficients having the optimal lobe pattern index as a reference, until the first group of DBF coefficients superior to the current group of DBF coefficients is calculated;

wherein the DBF coefficient generation sub-module is specifically configured to:

if it is indicated in the failure mode information that a failure type of the failed transceiver channel is a complete failure, generate multiple groups of DBF coefficients with the DBF coefficient corresponding to the failed transceiver channel being zero; and if it is indicated in the failure mode information that a failure type of the failed transceiver channel is a partial failure, generate multiple groups of DBF coefficients with the DBF coefficient corresponding to the failed transceiver channel lower than a preset DBF coefficient of the failed transceiver channel.

8. The active antenna device according to claim 7, wherein the DBF coefficient detection module comprises:

a signal detection sub-module, configured to detect information of amplitudes, phases and time delays of input signals and output signals of the multiple transceiver channels through a preset calibration transceiver channel, wherein the calibration transceiver channel has a coupled relation with each of the transceiver channels;

a DBF coefficient calculation sub-module, configured to calculate the DBF coefficient of each of the transceiver channels according to a difference between the input signal and the output signal of each of the transceiver channels on the information of amplitudes, phases and time delays detected by the signal detection sub-module; and a failed channel determination sub-module, configured to, if a difference between the DBF coefficient of any one of the transceiver channels and a preset DBF coefficient of the transceiver channel is greater than a preset maximum difference, determine that the transceiver channel has a failure.

9. The active antenna device according to claim 7, further comprising:

a second optimization processing module, configured to continue to calculate a second group of DBF coefficients superior to the first group of DBF coefficients with the first group of DBF coefficients as a reference, if the first group of DBF coefficients does not meet a preset optimization standard after the first DBF coefficient updating module correspondingly updates the DBF coefficients of the transceiver channels, until the second group of DBF coefficients meets the preset optimization standard; and a second DBF coefficient updating module, configured to correspondingly update the DBF coefficients of the transceiver channels according to the second group of DBF coefficients.

\* \* \* \* \*